US008660721B2

(12) United States Patent
Fernandez

(10) Patent No.: US 8,660,721 B2
(45) Date of Patent: Feb. 25, 2014

(54) METHOD AND DEVICE FOR CONTROLLING ENGINE SPEED OF AN AIRCRAFT DURING A TAKE-OFF

(75) Inventor: Brice Fernandez, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/440,390

(22) Filed: Apr. 5, 2012

(65) Prior Publication Data

US 2013/0110327 A1 May 2, 2013

(30) Foreign Application Priority Data

Apr. 7, 2011 (FR) ...................................... 11 53019

(51) Int. Cl.
*G06F 19/00* (2011.01)
*G06G 7/70* (2006.01)

(52) U.S. Cl.
USPC .......................................................... 701/15

(58) Field of Classification Search
USPC .......................................................... 700/15
See application file for complete search history.

(56) References Cited

U.S. PATENT DOCUMENTS

| | | | | | |
|---|---|---|---|---|---|
| 2,669,837 | A | * | 2/1954 | Harris | 60/39.15 |
| 3,120,359 | A | * | 2/1964 | Sprecher | 244/12.1 |
| 3,736,796 | A | * | 6/1973 | Hohenberg | 73/178 T |
| 4,546,353 | A | * | 10/1985 | Stockton | 340/966 |
| 8,290,683 | B2 | * | 10/2012 | Luppold | 701/100 |
| 2005/0028513 | A1 | | 2/2005 | Guillot-Salomon et al. | |
| 2007/0142980 | A1 | * | 6/2007 | Ausman et al. | 701/3 |
| 2008/0188999 | A1 | * | 8/2008 | Mathieu et al. | 701/7 |
| 2008/0249671 | A1 | | 10/2008 | Remy | |
| 2010/0070112 | A1 | | 3/2010 | Couey et al. | |
| 2010/0302073 | A1 | | 12/2010 | Fernandez | |
| 2010/0302074 | A1 | * | 12/2010 | Campagne et al. | 340/971 |
| 2011/0040431 | A1 | * | 2/2011 | Griffith et al. | 701/15 |
| 2011/0066306 | A1 | * | 3/2011 | Berthereau | 701/15 |
| 2011/0071708 | A1 | | 3/2011 | Chaniot et al. | |
| 2012/0316706 | A1 | * | 12/2012 | Guedes et al. | 701/15 |

FOREIGN PATENT DOCUMENTS

| | | |
|---|---|---|
| EP | 1505280 | 2/2005 |
| EP | 2301844 | 3/2011 |
| FR | 2890939 | 3/2007 |

OTHER PUBLICATIONS

French Patent Office, Preliminary Search Report for FR 1153019, Nov. 21, 2011 (2 pgs.).

* cited by examiner

*Primary Examiner* — Fadey Jabr
*Assistant Examiner* — Paula L Schneider
(74) *Attorney, Agent, or Firm* — Wood, Herron & Evans, LLP

(57) ABSTRACT

A device for controlling engine speed of a multi-engine aircraft includes a series of components for automatically controlling the speed of the engines during the take-off, so as to avoid discrepancies in the engine speeds. To this end, as long as all engines of the aircraft do not have, at least at given intermediary moment of the take-off, a driving parameter value equal to a preset intermediate value of the parameter, the speed of all of the engines cannot exceed an intermediate speed associated with the preset intermediate value. Thus, all engines must reach the intermediate speed so that the acceleration to a higher take-off speed can continue simultaneously for all engines.

10 Claims, 2 Drawing Sheets

METHOD AND DEVICE FOR CONTROLLING ENGINE SPEED OF AN AIRCRAFT DURING A TAKE-OFF

TECHNICAL FIELD

The present invention relates to a method and a device for controlling engine speed in a multi-engine aircraft during a take-off, as well as an aircraft provided with such a device.

Although the present invention is particularly adapted for airplanes provided with turbojets, it is by no way limited to such an application. It could be equally implemented on airplanes provided with turboprop engines.

BACKGROUND

It is known that such turbojets are controlled by a reliable parameter, referred to as a driving parameter, representative of the thrust level of said turbojets and that there are two kinds of driving parameters, one of them being the ratio Engine Pressure Ratio ("EPR") between the gas pressure at the outlet and at the inlet of the turbojets and the other one being linked to the speed N1 of the fan thereof.

For a determined turbojet, the nature of the driving parameter, that is the ratio EPR or the speed N1, is set by the manufacturer of said turbojet.

It is also known that, preliminarily to the take-off, the turbojets are maintained in an idling speed, with which an idling value of a driving parameter EPR or N1 is associated.

Upon the initiation of the take-off, the pilots of the airplane, thru a voluntary action on the throttle lever, progressively increase the speed of the turbojets, from the idling speed, so as to reach a predefined take-off speed a take-off value of the driving parameter is associated with.

However, it frequently occurs, during the take-off, that the turbojets of an airplane have not all the same current value of the driving parameter at a given moment, although the corresponding throttle levers are in an identical position. Indeed, the acceleration of the fan from the idling speed is likely to vary according to the turbojets of one single airplane, for instance, because:
- the mechanical parts of the different turbojets are not lubricated identically;
- some turbojets of the airplane have been changed, while the other ones are original ones, so that they do not have all the same wear;
- the calibration of the idling speed is not uniform between all the turbojets;
- etc.

This results in an outlet thrust dissymmetry of the turbojets of the airplane able to lead to a side deflection thereof, upon the take-off acceleration, that pilots must imperatively correct. Such a deflection is further even more significant as the speed of the airplane is not very high.

Such direction problems generate, for pilots, an additional workload and an additional vigilance upon a take-off already requiring significant attention.

Moreover, if the correction implemented by pilots is inappropriate or too much delayed, the take-off could be interrupted, thereby disturbing the traffic on the ground.

The aim of the present invention involves overcoming such drawbacks and, more specifically limiting, even removing, the above mentioned direction problems encountered during a take-off.

SUMMARY OF THE INVENTION

To this end, according to the invention, the method for controlling the engine speed of a multi-engine aircraft during a take-off, wherein a take-off speed is preliminarily determined with which a preset take-off value is associated, being common to all the engines and corresponding to a first particular value of a driving parameter of said engines, is remarkable in that:
- at least one intermediary preset value is preliminarily determined, common to all the engines and corresponding to one second particular value of the driving parameter, said intermediary preset value being strictly lower than the preset take-off value; and
- the following steps are automatically carried out:
  upon the initiation of the take-off, the speed of said engines increases from an idling speed to an intermediary speed corresponding to the determined intermediary preset value, so that the driving parameter associated with each one of the engines reaches said intermediary preset;
  for each one of said engines, the associated current value of the driving parameter is measured;
  it is detected whether, for all the engines, the difference between the current value of the driving parameter associated with each one of said engines and the determined intermediary preset value is, in absolute value, at the most equal to a predefined threshold; and
  when, for all the engines, said associated difference is at the most equal to said predefined threshold, increasing the engine speed up to the determined take-off speed is continued, so that the driving parameter associated to the latter reaches the preset take-off value.

Thus, thanks to this invention, as long as the engines of the aircraft do not have, at least at a given moment of a take-off, a roughly identical driving parameter value (that is the predetermined intermediary preset value), the engine speed cannot exceed the intermediary speed associated with said intermediary preset value. Before resuming the speed increase for reaching the take-off speed, the value of the driving parameter of each one of the engines should be roughly equal to the intermediary preset value. This allows to automatically remove an optional discrepancy of the value of the driving parameter between the engines, able to generate a speed dissymmetry between the engines, before resuming the speed increase. Thereby any risk of a significant side deflection of the aircraft (generated by such a speed dissymmetry) able to require pilots to interfere in order to be corrected, is thus prevented. The pilots' workload is reduced, on the one hand, because controlling the engine speed is carried out automatically upon the take-off and, on the other hand, because this invention nearly completely precludes the risk of a side deflection of the aircraft upon the take-off.

In a particular embodiment according to this invention:
- a time-delay with a predefined duration is triggered upon the initiation of the take-off; and
- a warning is emitted to the pilots of the aircraft when said difference associated with at least one of the engines remains higher than said threshold after said time-delay has expired.

Thus, the pilots can decide to interrupt the take-off if they consider this is necessary, after having been warned.

Alternatively or additionally, it is indeed obvious that the take-off could be automatically interrupted, in the case where said difference associated with at least one of the engines would remain higher than said threshold after a time-delay has expired.

Furthermore, when the engines are turbojets, the driving parameter associated with the engines could be either the ratio EPR between the gas pressures at the outlet and at the inlet of the engines, or the rotation speed N1 of the fan of the engines.

However, instead of the driving parameter N1 or EPR, this invention could be similarly implemented using a thrust parameter defined from N1 and/or from EPR.

Preferably, the take-off is initiated when the throttle levers respectively associated with the engines are brought in a position corresponding to the determined take-off speed.

Thus, once the controlling levers are in a take-off position, the pilots are normally exempted from any additional handling of the latter, at least until take-off is completed.

Advantageously, the detection step could be carried out in a continuous mode during the whole take-off. Any other appropriate detection mode could however be implemented, for instance a detection at predetermined regular intervals.

Furthermore, the present invention further relates to a device for controlling the engine speed of a multi-engine aircraft during a take-off including:

means for receiving at least one preset value, common to all the engines and corresponding to a particular value of the driving parameter;

parameter measurement sensors that measure, for each one of the engines, the associated value of the driving parameter; and engine speed controllers that control the engine speed, is remarkable in that:

the preset value is an intermediary preset value strictly lower than a take-off preset value corresponding to a predetermined take-off speed;

the device also includes means for detecting whether, for all the engines, the difference between the current value of the driving parameter associated with each one of the engines and the intermediary preset value is, in absolute value, at the most equal to a predefined threshold; and the engine speed controllers for controlling the engine speed are configured so as to:

receive an order representative of the predetermined take-off speed;

after the initiation of the take-off, increase the speed of the engines from an idling speed to an intermediary speed corresponding to the determined intermediary preset value, so that the driving parameter associated with each one of the engines reaches the intermediary preset value;

continue the increase of the engine speed up to the predetermined take-off speed, when, for all the engines, the associated difference is at the most equal to the predefined threshold, so that the driving parameter associated therewith reaches the take-off preset value.

In an embodiment according to this invention, the device also comprises:

a time-delay device able to trigger, upon the initiation of the take-off, a time-delay of a predefined duration; and a warning device that emits a warning to the pilots of the aircraft when the difference associated with at least one of the engines remains higher than the threshold after the time-delay has expired.

Moreover, the present invention also relates to an aircraft including a controlling device such as described hereinabove.

BRIEF DESCRIPTION OF THE DRAWINGS

The FIGS. of the appended drawing will better explain how this invention could be implemented. In these FIGS., like reference numerals relate to like components.

DETAILED DESCRIPTION

Figure 1:
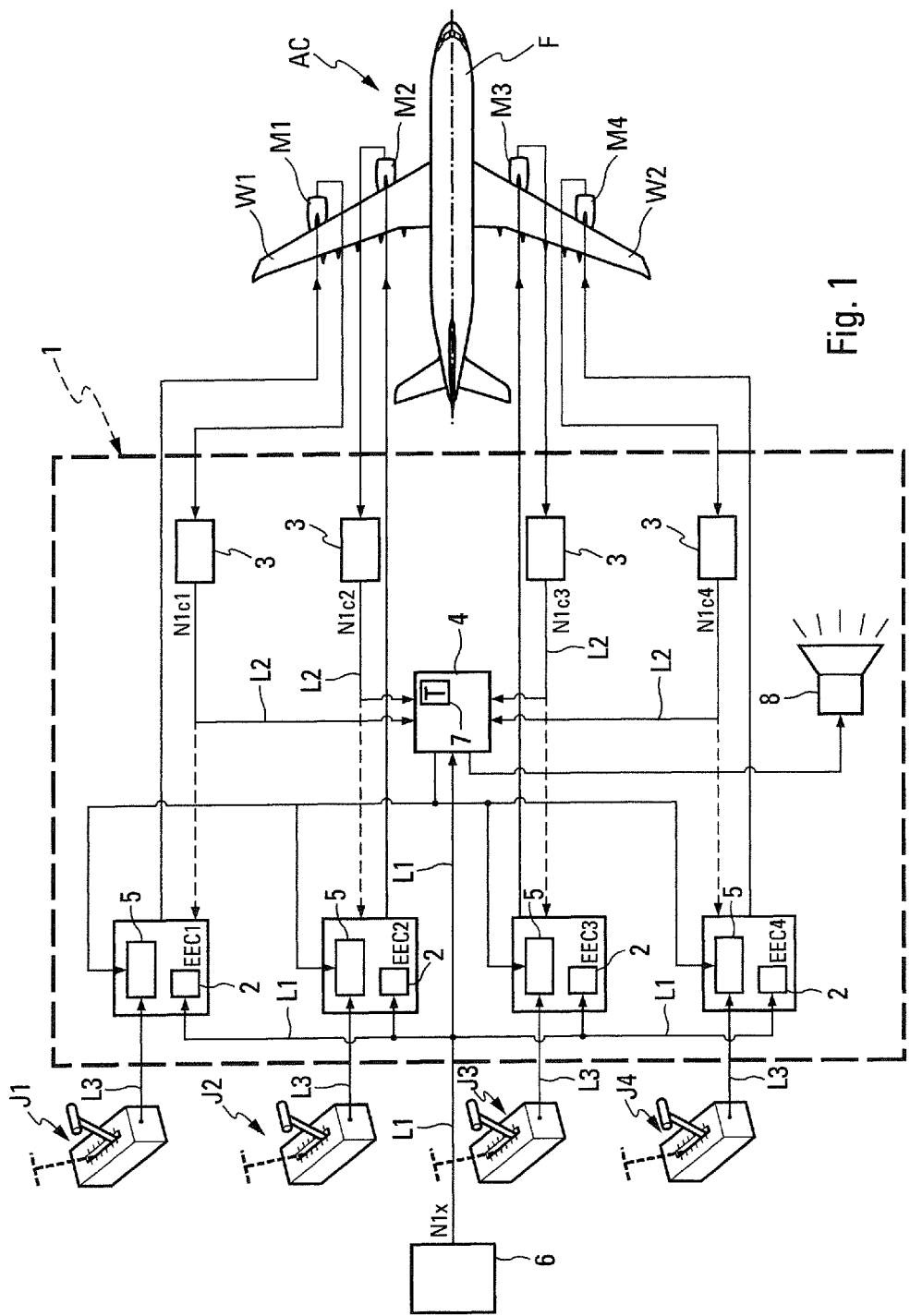
FIG. 1 is a block diagram of a device, according to the invention, for controlling the engine speed of a four-engine airplane, shown from the top, during a take-off.

The four-engine airplane AC, schematically shown from the top on FIG. 1, comprises a fuselage F and two wings W1 and W2, being symmetrical with respect to said fuselage F. The wing W1 carries an external engine M1 and an internal engine M2. Similarly, the wing W2 carries an internal engine M3 and an external engine M4.

Each engine M1 to M4 is of the double flux turbojet type, but this invention is by no way limited to this example, as explained previously.

As is schematically shown on FIG. 1, the speed of each engine M1 to M4 of the airplane AC could be controlled by means of a specific throttle lever J1 to J4 able to occupy any position between a maximum speed position (shown in dashed lines) and an idling position (shown in a full line).

Usually, preliminarily to the take-off, the pilots of the airplane AC determine the take-off parameters, and including the take-off speed to be applied (that is the usual speeds FLEX or TOGA), as a function of characteristics of the airplane AC (design, bulk in the empty state, load, etc.), the dimensions and the state of the runway, the meteorological information, etc.

With the determined take-off speed there is associated a take-off preset value $N1d$ common to all the engines M1 to M4 and corresponding to a particular value of a driving parameter of said engines M1 to M4.

As also known, the driving parameter of each one of said engines M1 to M4—such a parameter being representative of the thrust level of the corresponding engine—is either the one known in the aeronautical field as EPR (Engine Pressure Ratio) and being equal to the ratio between the gas pressure at the outlet of the turbine and the gas pressure in the air inlet cowl, or the one known as N1 and corresponding to the rotation speed of the fan of said engines M1 to M4.

In the remainder of the description, only the driving parameter N1 will be considered. It is obvious that the invention could be implemented similarly with the parameter EPR.

In addition, the speed of each one of the engines M1 to M4 is controlled, as known, by a controlling electronic calculator EEC1 to EEC4 (Electronic Engine Control). Such calculators EEC1 to EEC4 associated with the engines M1 to M4 each receive an order representative of the engine speed to be applied, transmitted by the associated throttle levers J1 to J4 and corresponding to the respective position thereof. The calculators EEC1 to EEC4 calculate, more specifically from such received order, the fuel flow rate to be addressed to the engines M1 to M4, respectively.

On FIG. 1, the throttle levers J1 to J4 of the engines M1 to M4 and the calculators EEC1 to EEC4 are shown outside the airplane AC, while they actually are mounted on board the latter.

According to this invention, a device 1 for automatically controlling the engines speed M1 to M4 of the airplane AC during a take-off is embedded on board the latter. It is also shown outside the airplane AC for clarity reasons.

The controlling device 1 of this invention comprises:

means 2 for receiving a preliminarily determined intermediary preset value N1x (via the link L1), common to all the engines M1 to M4 and corresponding to a particular value of the driving parameter N1. The intermediary preset value N1x is strictly lower than the take-off preset value N1d (namely N1x<N1d). For instance, N1x could be equal to 50% of N1d;

parameter measurement sensors 3 for continuously measuring, for each one of the engines M1 to M4, the current value of N1. For instance, the parameter measurement sensors 3 could comprise one or more rotation speed sensors so as to give the measurement N1c1 to N1c4 of the current rotation speed of the fan of each one of the engines M1 to M4, respectively. Such current values N1c1 to N1c4 could be displayed on screens embedded in the cockpit of the airplane AC, so as to be viewed by the pilots; and means 4 for detecting whether, for all the engines M1 to M4, the difference d1 to d4 between the current value N1c1 to N1c4 associated with each one of the engines and the intermediary preset value N1x is, in absolute value, at the most equal to a predefined threshold Th (for instance 1% of N1x) (namely |N1cj−N1x|=dj with j=1, 2, 3 or 4, so that dj<Th). Such means 4 is able to receive the current values N1c1 to N1c4 and the intermediary preset value N1x, thru the links L1 and L2;

In addition, the controlling device 1 comprises engine speed controllers 5 for controlling the engine speed M1 to M4, respectively. Such engine speed controllers 5 are able to:

receive the order representative of the predetermined take-off speed transmitted by the corresponding throttle levers J1 to J4 to the engines M1 to M4, via the links L3;

increase, after the take-off has been initiated, the engine speed M1 to M4 from an idling speed up to an intermediary speed corresponding to the intermediary preset value N1x, so that the driving parameter N1 associated with each one of the engines M1 to M4 reaches N1x;

continue increasing the engine speed M1 to M4 up to the determined take-off speed, when, for all the engines M1 to M4, the associated difference d1 to d4 is at the most equal to the predefined threshold Th, so that the driving parameter N1 associated with the latter reaches N1d.

In other words, as long as there is at least one of the differences d1 to d4 strictly higher than the threshold Th, the engine speed controllers 5 maintain the speed of the other engines (difference d1 to d4 is at the most equal to the threshold Th) in the intermediary speed. There is no increase of the speed for reaching the take-off speed for these engines.

In a particular embodiment of this invention shown on FIG. 1, the means 2 and engine speed controller 5 associated with each of the engines M1 to M4 of the device 1 could be integrated into the electronic controlling calculators EEC 1 to EEC4, respectively.

According to this invention, the controlling device 1 is activated as soon as the take-off is initiated, that is when the throttle levers J1 to J4 associated with the engines M1 to M4 are brought in a position corresponding to the determined take-off speed. Thus, once the levers J1 to J4 are in a take-off position, it is then no longer required to handle them (except, optionally in the case of an emergency situation) until the end of the take-off (the device 1 automatically managing the engines speed M1 to M4).

Nevertheless, a deactivation device (not shown on the FIGS.) of the controlling device 1 could be provided, so that the pilots are able to manually control the take-off of the airplane AC, in a usual way.

Furthermore, according to this invention, the intermediary preset value N1x is obtained, preliminarily to the take-off, using the determination device 6, able to have the form, for instance, of a laptop or of a digital simulator on the ground, whether handled or not by the pilots. The determination device 6 could determine N1x from data relative to the characteristics of the airplane AC (design, bulk in the empty state, load, etc.), to the dimensions of the runway, to meteorological information, etc.

Although the determination device 6 is shown outside the controlling device 1, it is obvious that it could, alternatively, be integrated into the latter. Automatically implementing the determination device 6 also remains possible.

Furthermore, the controlling device 1 could also comprise:

a time-delay device 7 able to trigger, upon the initiation of the take-off, a time-delay T of a predefined duration; and a warning device 8 for emitting a warning to the pilots of the airplane AC, when the difference d1 to d4 associated with at least one of the engines M1 to M4 remains higher than the threshold Th until the time-delay T has expired. The warning could be visual and/or sound and be spread, for instance, inside the cockpit of the airplane AC.

Figure 2:
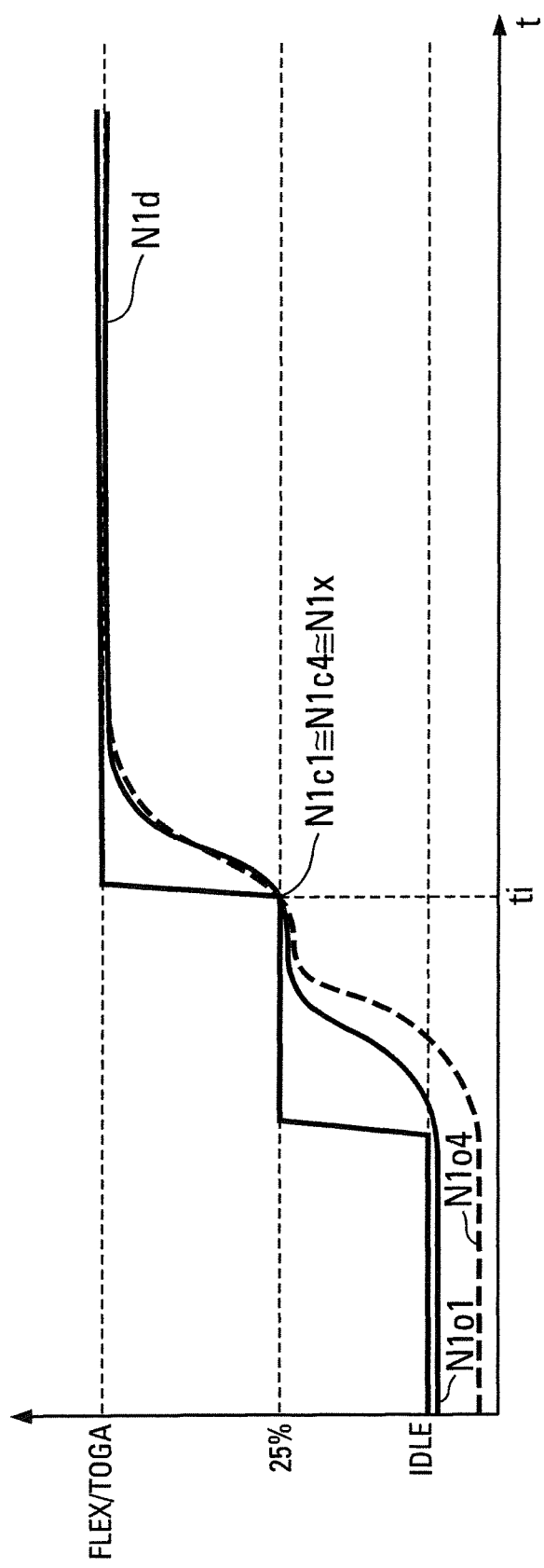
FIG. 2 is a graph showing the time evolution of the rotation speed N1 in the two external engines of the airplane of FIG. 1, according to the engine speed applied to the latter during a take-off.

Furthermore, FIG. 2 illustrates, by way of an example, a diagram showing the time evolution of the parameter N1 associated with each one of the two external engines M1 (in solid line) and M4 (in a dashed line) of the airplane AC (see FIG. 1) depending on the speed engine applied upon a take-off.

As shown on FIG. 2, although the engines M1 and M4 have, in idling speed, different respective rotation speeds N1o1 and N1o4 (as a result, for instance, of a different calibration of the idling speed), namely N1o1>N1o4, these converge, thanks to this invention, to a same intermediary value Nix (moment ti).

Indeed, the fan of M1, having a rotation speed N1o1 higher than that N1o4 of the fan of M4, more rapidly reaches the speed N1x. However, thanks to this invention, it remains maintained at this speed N1x (the speed of M1 is stabilized at the intermediary speed associated with N1x) whereas the speed of the fan of M4 continues its acceleration so as to reach Nix. Once the latter has also reached Nix (moment ti), the fans of M1 and M4 roughly have the speed (namely N1x) and increasing the speed of M1 and M4 could then be continued so as to achieve the take-off speed.

As illustrated on FIG. 2, after continuing to increase the speed of M1 to M4 (moment ti) beyond the intermediary speed, the speeds of the fans of the latter roughly remain identical until they reach the value N1d. The speed difference between M1 and M4, existing preliminarily to the moment ti, has thus completely disappeared after this moment (without pilots being involved), eliminating any risk of thrust dissymmetry at the outlet of the engines M1 and M4.

Furthermore, the present invention could also implement, not a single one, but two or more intermediary preset values N1x. In such a case, increasing the engine speed occurs through successive levels (there are as many intermediary levels as intermediary preset values being implemented).

In addition, this invention could also be implemented so that it only applies to external engines of a four-engine airplane.

The invention claimed is:

1. A method for controlling the engine speed of a multi-engine aircraft upon a take-off, the method comprising:

determining a take-off speed, with which a take-off preset value of a driving parameter of the engines is associated, being common to all the engines determining with a determination device at least one intermediary preset value of the driving parameter, common to all the engines and corresponding to an intermediary speed, the intermediary preset value being lower than the take-off preset value;

communicating the take-off preset value and the intermediary preset value to engine speed controllers integrated into electronic controlling calculators on board the aircraft;

initiating the take-off by automatically increasing a speed of the engines with the engine speed controllers from an idling speed up to the intermediary speed corresponding to the intermediary preset value, so that the driving parameter associated with each one of the engines reaches the intermediary preset value;

automatically measuring with parameter measurement sensors on board the aircraft, for each one of the engines, a current value of the driving parameter;

automatically determining with the electronic controlling calculators on board the aircraft whether, for each of the engines, a difference between the current value of the driving parameter and the intermediary preset value is less than or equal to a predefined threshold indicating that the speed of the corresponding engine is equal to the intermediary speed;

when less than all of the engines are operating at the intermediary speed, automatically maintaining with the engine speed controllers the speed of any of the engines operating at the intermediary speed and preventing further acceleration of engines operating at the intermediary speed until others of the engines accelerate to the intermediary speed; and when all of the engines are operating at the intermediary speed, automatically increasing with the engine speed controllers the speed of all of the engines up to the determined take-off speed, so that the driving parameter of all of the engines reaches the take-off preset value.

2. The method according to claim 1, further comprising:
triggering with a time-delay device on board the aircraft a time-delay with a predefined duration upon the initiation of the take-off; and emitting a warning with a warning device on board the aircraft to the pilots of the aircraft when the difference associated with at least one of the engines remains higher than the predefined threshold after the time-delay has expired.

3. The method according to claim 1, wherein the engines are turbojets, and wherein the driving parameter of the engines is at least one of a ratio between gas pressures at an outlet and at an inlet of the engines, and a rotation speed N1 of a fan of the engines.

4. The method according to claim 1, wherein initiating the take-off further comprises:
receiving an order with the engine speed controllers that is generated by throttle levers respectively associated with the engines being moved into a position corresponding to the take-off speed.

5. The method according to claim 1, wherein the automatically determining the difference step is carried out continuously during an entirety of the take-off.

6. A device for controlling the engine speed of a multi-engine aircraft during a take-off, the device comprising:
engine speed controllers on board the aircraft and associated with each of the engines for receiving (i) a takeoff preset value of a driving parameter of the engines, common to all the engines and corresponding to a take-off speed of the engines, and (ii) an intermediary preset value of the driving parameter, common to all of the engines and corresponding to an intermediary speed of the engines, the intermediary preset value being lower than the take-off preset value, the engine speed controllers integrated into electronic controlling calculators;

a determination device that determines the intermediary preset value and communicates with the engine speed controllers;

parameter measurement sensors on board the aircraft that automatically measure, for each one of the engines, a current value of the driving parameter;

wherein the electronic controlling calculators automatically determine whether, for each of the engines, a difference between the current value of the driving parameter and the intermediary preset value is less than or equal to a predefined threshold indicating that a speed of the corresponding engine is equal to the intermediary speed; and wherein the engine speed controllers control the speed of each of the engines, the engine speed controllers operating the engines during the take-off by:
initiating the take-off by automatically increasing the speed of the engines from an idling speed up to the intermediary speed corresponding to the intermediary preset value, so that the driving parameter associated with each one of the engines reaches said intermediary preset value;

when less than all of the engines are operating at the intermediary speed, automatically maintaining the speed of any of the engines operating at the intermediary speed and preventing further acceleration of engines operating at the intermediary speed until others of the engines accelerate to the intermediary speed; and when all of the engines are operating at the intermediary speed, automatically increasing the speed of all of the engines up to the determined take-off speed, so that the driving parameter of all of the engines reaches the take-off preset value.

7. The device according to claim 6, further comprising:
a time-delay device on board the aircraft that triggers, upon the initiation of the take-off, a time-delay with a predefined duration; and a warning device on board the aircraft that emits a warning to the pilots of the aircraft, when the difference associated with at least one of the engines remains higher than the predefined threshold after the time-delay has expired.

8. The device according to claim 6, wherein the engines are turbojets, and wherein the driving parameter of the engines is at least one of a ratio between gas pressures at an outlet and at an inlet of the engines, and a rotation speed of a fan of the engines.

9. The device according to claim 6, further comprising:
a plurality of throttle levers on board the aircraft and respectively associated with the engines, the throttle levers communicating with the engine speed controls to provide an order to bring the engines up to the take-off speed.

10. An aircraft, comprising:
a plurality of engines; and
a device for controlling the engine speed of the plurality of engines during a take-off, the device comprising:
engine speed controllers on board the aircraft and associated with each of the engines for receiving (i) a takeoff preset value of a driving parameter of the engines, common to all the engines and corresponding to a take-off speed of the engines, and (ii) an intermediary preset value of the driving parameter, common to all of the engines and corresponding to an intermediary speed of the engines, the intermediary preset value being lower than the take-off preset value, the engine speed controllers integrated into electronic controlling calculators;

a determination device that determines the intermediary preset value and communicates with the engine speed controllers;

parameter measurement sensors on board the aircraft that automatically measure, for each one of the engines, a current value of the driving parameter;

wherein the electronic controlling calculators automatically determine whether, for each of the engines, a difference between the current value of the driving parameter and the intermediary preset value is less than or equal to a predefined threshold indicating that a speed of the corresponding engine is equal to the intermediary speed; and wherein the engine speed controllers control the speed of each of the engines, the engine speed controllers operating the engines during the take-off by:

initiating the take-off by automatically increasing the speed of the engines from an idling speed up to the intermediary speed corresponding to the intermediary preset value, so that the driving parameter associated with each one of the engines reaches said intermediary preset value;

when less than all of the engines are operating at the intermediary speed, automatically maintaining the speed of any of the engines operating at the intermediary speed and preventing further acceleration of engines operating at the intermediary speed until others of the engines accelerate to the intermediary speed; and when all of the engines are operating at the intermediary speed, automatically increasing the speed of all of the engines up to the determined take-off speed, so that the driving parameter of all of the engines reaches the take-off preset value.

* * * * *